United States Patent [19]
Albach et al.

[11] Patent Number: 4,719,552
[45] Date of Patent: Jan. 12, 1988

[54] AC-DC CONVERTER TRIGGERED BY VARIABLE FREQUENCY PULSES

[75] Inventors: Manfred Albach; Fritz A. Wegener, both of Aachen, Fed. Rep. of Germany

[73] Assignee: U.S. Philips Corporation, New York, N.Y.

[21] Appl. No.: 930,821

[22] Filed: Nov. 14, 1986

[30] Foreign Application Priority Data

Nov. 22, 1985 [DE] Fed. Rep. of Germany ....... 3541307

[51] Int. Cl.⁴ ............................................ H02M 3/156
[52] U.S. Cl. ........................................ 363/44; 323/222; 323/282; 323/299; 363/89
[58] Field of Search ..................... 363/44, 45, 82, 89, 363/90, 126, 81; 323/222, 282, 299, 300, 285

[56] References Cited

U.S. PATENT DOCUMENTS

| | | | |
|---|---|---|---|
| 4,190,882 | 2/1980 | Chevalier | 363/26 |
| 4,251,752 | 2/1981 | Stolz | 315/208 |
| 4,481,460 | 11/1984 | Kronig et al. | 323/222 |
| 4,562,383 | 12/1985 | Kerscher et al. | 323/222 |
| 4,562,527 | 12/1985 | Klamt | 323/222 |

FOREIGN PATENT DOCUMENTS 198873 11/1984 Japan ................................. 323/222

OTHER PUBLICATIONS

Marple, "Low-Distortion Three-Phase Power Regulator", IBM Tech. Discl. Bul., vol. 22, No. 3, p. 970, Aug. 1, 1979.

Primary Examiner—William H. Beha, Jr.
Attorney, Agent, or Firm—Robert T. Mayer; Bernard Franzblau

[57] ABSTRACT

A circuit arrangement for producing a direct voltage from a sinusoidal input voltage comprising a filter for suppressing interference voltages, a rectifier, a switched mode power supply part and a pulse generator. The pulse generator produces from the rectified input signal switching pulses for the switched mode power supply part. The frequency of these pulses is varied so that it is a minimum at the maximum value of the rectified input voltage and is a maximum at the minimum value and is varied between the extreme values so that the second derivative of the frequency with respect to time is always zero or negative. A switching pulse is terminated when a signal proportional to the output current of the rectifier exceeds the difference between a signal proportional to the rectified input voltage and an integrated signal proportional to the output current of the rectifier.

10 Claims, 4 Drawing Figures

AC-DC CONVERTER TRIGGERED BY VARIABLE FREQUENCY PULSES

BACKGROUND OF THE INVENTION

This invention relates to a circuit arrangement for forming a direct voltage from an essentially sinusoidal input voltage comprising a filter for suppressing high-frequency interference signals, a switched mode power supply part which is composed of a diode, a coil, a capacitor and a transistor and is coupled to the filter through a rectifier, while its elements are arranged so that in the conductive state of the transistor the diode is cut off and the coil current flows at least through the transistor and in the cut-off state flows through the diode and a parallel arrangement of a load and the capacitor, and a pulse generator which forms from the input voltage switching pulses for the transistor, whose frequency is varied uniformly in time between a minimum frequency at the maximum value of the rectifier input voltage and a maximum frequency at the minimum value.

Such a circuit arrangement is known from German Offenlegungsschrift No. 26 52 275 and may be used, for example, as an electric ballast unit for gas discharge lamps. The filter is connected to an alternating voltage mains and derives therefrom a substantially sinusoidal current. The transistor is controlled so that the transient duration is constant, that is to say that the transistor is switched on again when the coil current reaches the value zero. The variation in time of the frequency of the pulses controlling the transistor is parabolic during a half cycle of the input voltage. The maximum value of the frequency is reached at the minimum value of the input voltage and the minimum value of the frequency is reached at the maximum value of the input voltage.

Depending upon the switching processes in the switched mode power supply part, interference voltages are superimposed on the alternating voltage. These interference voltages occur above the minimum frequency of the pulses and become manifest in a disturbing manner, especially in the low frequency range. Such interference voltages are reduced go given tolerable values by the filter connected between the input of the circuit arrangement and the rectifier. In general, such a filter is composed of a coil and a capacitor.

Permissible values for such interference voltages are defined in the VDE standard 0871. The maximum interference voltages prescribed in the VDE standard 0871 are to be taken into account for the proportioning of the filter. It has been found that especially the interference voltages at low frequencies determine the size of the coil of the filter.

SUMMARY OF THE INVENTION

The invention has for an object to reduce the interference voltages at low frequencies.

According to the invention, this object is achieved in that the pulse generator comprises a voltage-to-frequency converter, responsive to the input voltage to form starting pulses which determine the beginning of the switching pulses and whose frequency is varied between the extreme (minimum and maximum) values in such a manner that the second derivative of the frequency with respect to time is always zero or negative. The pulse generator further comprises a first integrator which produces an integrated output signal proportional to the output current of the rectifier and whose time constant is larger than the reciprocal value of the minimum frequency, a superposition circuit develops an output signal equal to the difference between a signal proportional to the rectified input voltage and the output signal of the first integrator a first comparison circuit produces a signal for terminating a pulse when a signal proportional to the output current of the rectifier exceeds the output signal of the superposition circuit.

In the circuit arrangement according to the invention, the frequency of the pulses is varied so that between the maximum frequency and the minimum frequency the variation of the frequency as a function of time is either linear or concave. The frequency consequently varies between the extreme values in such a manner that the second derivative of the frequency with respect to time is invariably zero or negative. This means that for the frequency f is holds for $0 \leq \omega t \leq \pi/2$ that:

$$f \cong f\text{max} - (f\text{max} - f\text{min})^\infty 2\omega t/\pi \quad (1)$$

and for $\pi/2 \leq \omega t \leq \pi$ that:

$$f \cong f\text{min} + (f\text{max} - f\text{min})^\infty 2(\omega t - \pi/2)/\pi \quad (2),$$

where fmin is the minimum frequency, fmax is the maximum frequency, $\omega$ is the angular frequency and t is the time. Since in this circuit arrangement the variation of the frequency as a function of time occurs more rapdily in the range of the minimum frequency than in the known circuit arrangement, the interference voltages, especially in the low frequency range, are reduced. Thus, the size of the coil of the filter assumes a smaller value, that is to say that the inductance of the coil decreases.

By means of the first integrator, the superposition circuit and the first comparison circuit, the switching-off instant of the transistor is determined so that on average a sinusoidal current is derived from the mains. The first integrator forms the average value of the high-frequency components of the signal proportional to the output current of the rectifier produced by the switching operations of the transistor. In the superposition circuit, a comparison signal is formed from the difference between the output signal of the first integrator and a signal proportional to the rectified input voltage. The output signal of the superposition circuit is compared in the first comparison circuit with a signal proportional to the output current of the rectifier. When the signal proportional to the output current of the rectifier exceeds the output signal of the superposition circuit, the first comparison circuit produces a signal which causes the transistor to pass from the conducting state to the cut-off state.

It should further be noted that a switched mode power supply part is known from U.S. Pat. No. 4,190,882 which supplies a high-frequency arrangement, for example, a radar transmitter, with a direct voltage and is controlled by a pulse generator. The frequency of the pulses varies linearly in time between 9 kHz and 11 kHz. However, this frequency variation is independent of the input voltage of the combinatorial circuit part. Moreover, this circuit arrangement should reduce interferences in the signal to be transmitted, which are produced by the switching operation in the combinatorial circuit part.

In a further embodiment of the invention, it is ensured that the voltage-to-frequency converter comprises a second comparison circuit comparing a reference voltage with a voltage proportional to the second rectified input voltage, a monostable trigger element activated by the comparison circuit when the reference voltage is larger than said voltage proportional to the rectified input voltage, a second integrator for integrating the output signal of the monostable trigger element, the time constant of this integrator being larger than the reciprocal value of the frequency of the input voltage, and a voltage-controlled oscillator controlled by the second integrator and producing the starting pulses. In this further embodiment, the frequency varies linearly in time between the maximum value and the minimum value. In this case, the equality symbol holds in the formula (1) and (2). The filter used is then a combination of a coil and a capacitor. For multistage filters, i.e. a chain circuit of simple filters comprising a coil and a capacitor, a frequency variation concave in time is required. In this case, in the formulae (1) and (2) the equality symbol does not hold.

The production of the switching pulses in the pulse generator can be taken over by a trigger element, which receives the starting pulses and the signal of the first comparison circuit.

The superposition circuit can be constructed so that it comprises an amplifier, to the non-inverting input of which is supplied a signal proportional to the rectified input voltage and the inverting input of which is connected to a first resistor connected to the output of the superposition circuit and to a second resistor connected to the output of the integrator. For the output signal of the integrator, the amplifier acts as an inverting amplifier, while for the signal proportional to the rectified input voltage, the amplifier acts as a non-inverting amplifier. The comparison signal is produced in that the signal proportional to the rectified input voltage and the output signal are weighted by the first and second resistors and the difference is formed between them. In order to adjust accurately the output signal of the superposition circuit supplied to the comparison circuit, it is ensured that a voltage divider is arranged between the superposition circuit and the first comparison circuit.

In this circuit arrangement, three different embodiments can be used as a switched mode power supply part. A first embodiment, a step-up voltage converter, is constructed so that the coil is connected on the one hand to the rectifier and on the other hand to the transistor and through the diode to the parallel arrangement of the load and the capacitor. In the step-up voltage converter, the output voltage is always larger than the input voltage. In the second embodiment, the step-down voltage converter, the output voltage is smaller than the input voltage. In this switched mode power supply part, the transistor is connected on the one hand to the rectifier and on the other to the diode and through the coil to the parallel arrangement of the load and the capacitor. In the third embodiment, the step-up/step-down voltage converter, the transistor is connected on the one hand to the rectifier and on the other hand to the coil and through the diode to the parallel arrangement of the capacitor and the load. In this circuit arrangement, the output voltage may be larger or smaller than the input voltage.

BRIEF DESCRIPTION OF THE DRAWINGS

In order that the invention may be readily carried out, it will now be described more fully with reference to the accompanying drawings, in which.

DESCRIPTION OF THE PREFERRED EMBODIMENTS

Figure 1:
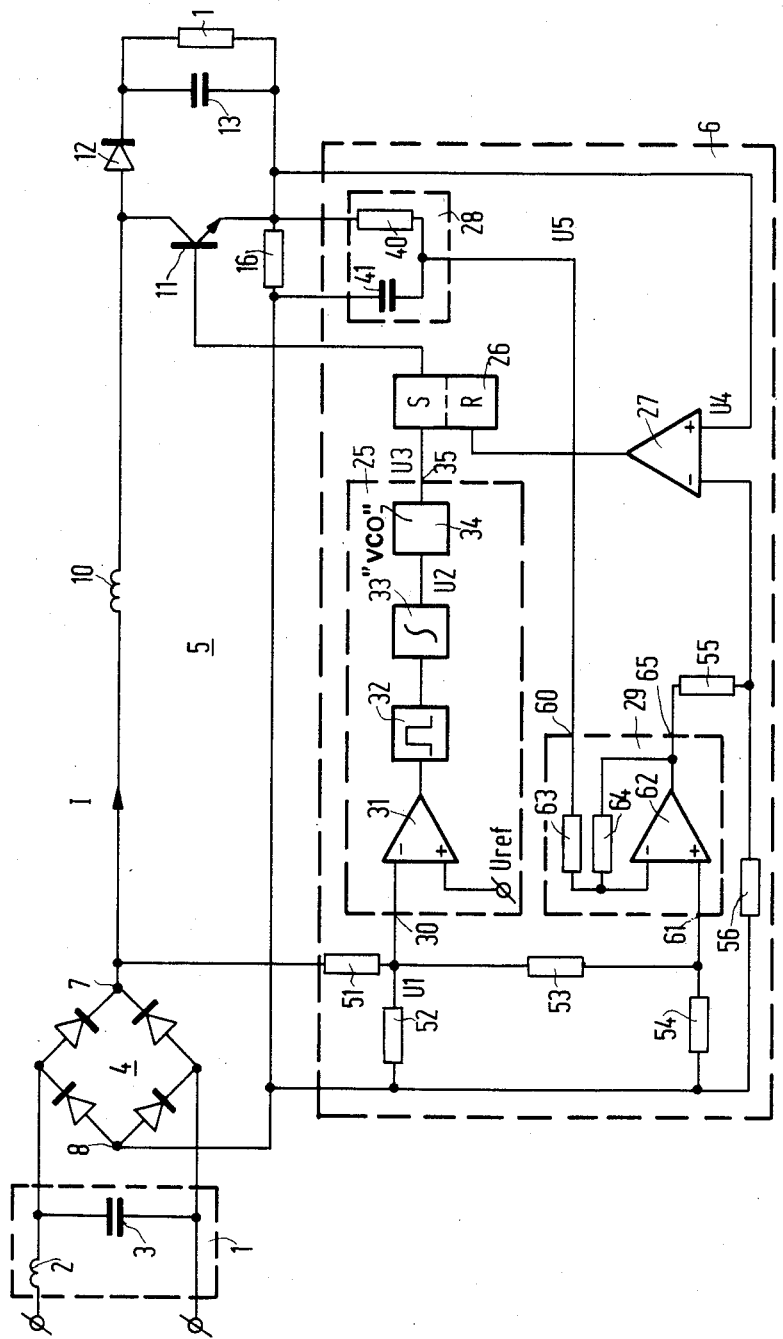
FIG. 1 shows a first embodiment of the invention.

In FIG. 1, a sinusoidal input voltage having an effective value of, for example, 220 V and a frequency of 50 Hz is supplied to a filter 1 comprising a coil 2 and a capacitor 3. The coil 2 is connected on the one hand to an input terminal and on the other hand to the capacitor 3, which is connected parallel to the output of the filter 1. The output of the filter 1 is connected to a rectifier bridge 4, which comprises four diodes and whose output is connected to a step-up voltage converter 5 (switched mode power supply part) and to a pulse generator 6 used for controlling the step-up voltage converter 5. The step-up voltage converter 5 comprises a coil 10 which is connected to the positive output terminal 7 of the rectifier 4. Further, the step-up converter 5 comprises an npn transistor 11, a diode 12 and a capacitor 13. The collector of the transistor 11, the anode of the diode 12 and the connection point of the coil 10 remote from the rectifier 4 are connected to each other. The capacitor 13, which has connected parallel to it a load 14, for example, a gas discharge lamp, with the required circuits, is arranged between the cathode of the diode 12 and the emitter of the transistor 11. Switching pulses of the pulse generator 6 are supplied to the base of the transistor 11, which pulses make the transistor 11 conduct. The transistor 11 may also be a field effect transistor.

The pulse generator 6 comprises six resistors 51 to 56, a voltage-to-frequency converter 25, an RS trigger element 26, a comparison circuit 27, an integrator 28 and a superposition circuit 29. The resistor 51 is connected on the one hand to the output terminal 7 of the rectifer 4 and on the other hand to the resistor 52 connected in turn to the output terminal 8, to the resistor 53 connected through the resistor 54 to the output terminal 8 and to an input 30 of the voltage-to-frequency converter 25. The voltage-to-frequency converter 25 comprises a comparison circuit 31, a monostable trigger element 32, an integrator 33 and a voltage-controlled oscillator 34. The comparison circuit 32 may be, for example, a comparator whose inverting input is at the same time the input 30 of the voltage-to-frequency converter 25. A reference voltage Uref is supplied to the non-inverting input of the comparison circuit 31. The output signal of the comparison circuit 31 is supplied through the monostable trigger element 32 to the integrator 33, which comprises, for example, a resistor and a capacitor whose time constant has to be larger than the reciprocal value of the frequency of the sinusoidal input signal. The voltage-controlled oscillator 34 arranged behind the integrator 33 produces pulses which are supplied through an output 35 of the voltage-to-frequency converter 25 to the set input of the RS trigger element 26. The output of the RS trigger element 26 is connected to the base of the transistor 11.

A measuring resistor 16, connected in parallel with a series arrangement of a resistor 40 and a capacitor 41, is connected between the output terminal 8 of the rectifier 4 and the emitter of the transistor 11. The resistor 40 and the capacitor 41 form part of the integrator 28, whose time constant must be smaller than the reciprocal value of the minimum frequency of the switching pulses of the transistor 11. The junction point between the capacitor 41 and the resistor 40 is connected to an input 60 of the superposition circuit 29. The other input 61 of the superposition circuit 29 is connected to the junction between the resistors 53 and 54.

The superposition circuit 29 comprises an amplifier 62 and two resistors 63 and 64. The resistor 63 is connected to the input 60 and the resistor 64 connected to the output 65 of the amplifier 62 are connected to the inverting input of the amplifier 62 and both resistors. The input 61 of the superposition circuit 29 is the noninverting input of the amplifier 62. The output 65 of the superposition circuit 29, which is at the same time the output of the amplifier 62, is connected through the resistor 55 to the comparison circuit 27, which may also be a comparator. The resistor 55 connected to the inverting input of the comparator 27 constitutes a voltage divider together with a resistor 56 arranged between the connection terminal 8 of the rectifier 4 and the inverting input of the comparator. The non-inverting input of the comparison circuit 27 is connected to the emitter of the transistor 11. The output signal of the comparison circuit 27 is supplied to the reset input of the trigger element 26.

When the transistor 11 is conducting, i.e. when the base of the transistor 11 receives a current, the diode 12 is cut off and the current I through the coil 10 flows through the collector-emitter path of the transistor 11 to the output terminal 8. When the transistor 11 is cut off, that is to say that no current is supplied to the base of the transistor 11, the diode 12 will conduct and the current I flows to the parallel arrangement of the capacitor 13 and the load 14. Since the frequency at which the transistor 11 is switched is higher than 20 kHz, it may be assumed that the voltage between the output terminals 7 and 8 of the rectifier 4 is constant, that is to say that, during the period in which the transistor 11 is conducting, the current I increases linearly with time, while, during the period in which the transistor 11 is cut off, the current I decreases with time.

Figure 2:
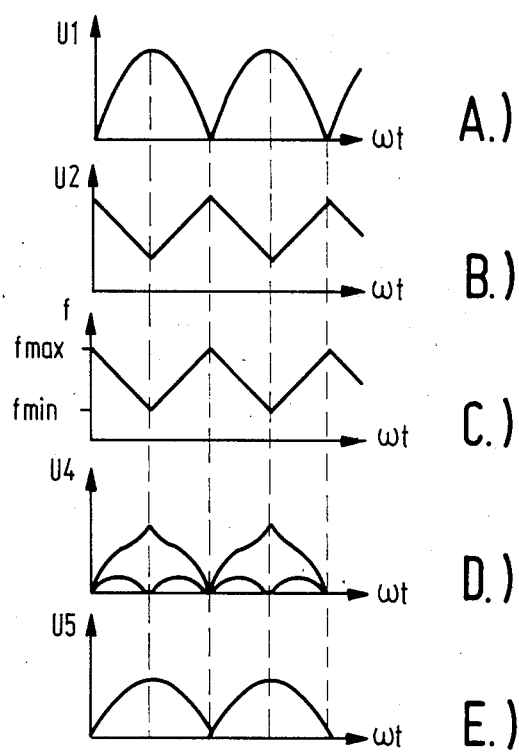
FIG. 2 shows diagrams which will aid in the explanation of FIG. 1.

The pulse generator produces, from the voltage at the output of the rectifier 4, current pulses which are supplied to the base of the transistor 11 and whose frequency depends upon the value of the rectified input voltage. With reference to FIG. 2, the operation of the pulse generator 6 will be explained hereinafter.

A voltage U1, which is proportional to the voltage at the output terminals 7 and 8 of the rectifier 4 and is shown in the diagram A of FIG. 2, is applied to the inverting input of the comparison circuit 31, which is at the same time the input 30 of the voltage-to-frequency converter 25. This proportional voltage U1, which is determined by the voltage divider comprising the resistors 51 to 54, is compared with the reference voltage Uref at the non-inverting input of the comparison circuit and when the voltage at the inverting input falls below the reference voltage Uref, the comparison circuit supplies a signal for producing a pulse in the monostable trigger element 32, which is terminated after a predetermined time, the hold time. The pulses produced by the monostable trigger element 32 occur two times per period of the input voltage and are integrated in the integrator 33. The triangular output signal U2 of the integrator 33 is shown in the diagram B of FIG. 2. This output voltage U2 is the frequency-determining control signal for the voltagecontrolled oscillator 34, whose output signal U3 forms the starting pulses for the trigger element 26. The variation of the frequency, which is proportional to the voltage U2, is shown in the diagram C.

At the minimum value of the voltage U1 proportional to the rectified output voltage of the rectifier 4, the voltage U1 and hence the frequency of the starting pulses has a maximum value, and at the maximum value of the voltage U1, the voltage U2 and hence the frequency has a minimum value. The frequency varies linearly with time between the extreme values. Consequently, the following formulae hold for the frequency f of the switching pulses. For $0 \leq \omega t \leq \pi/2$ it holds that:

$$f = f\text{max} - (f\text{max} - f\text{min})^{\infty} 2\omega t/\pi \quad (3)$$

and for $\pi/2 \leq \omega t \leq \pi$ it holds that:

$$f = f\text{min} + (f\text{max} - f\text{min})^{\infty} 2(\omega t - \pi/2)/\pi \quad (4)$$

where fmax is the maximum frequency, fmin is the minimum frequency, $\omega$ is the angular frequency and t is the time.

The monostable trigger element 32 should be adjusted so that at the frequency of 50 Hz of the sinusoidal input signal the hold state lasts 5 ms and that it can be set again after 5 ms. The reference value supplied to the non-inverting input of the comparison circuit 31 must be chosen so that the maximum frequency value is reached as closely as possible at the corresponding zero values of the input voltage. The maximum and the minimum frequency, respectively, are defined by the time constant of the integrator 33.

The trigger element 26 is set by a pulse of the voltage-to-frequency converter 25 and produces a current pulse which renders the transistor 11 conducting. The output current I of the rectifier 4 produces in the measuring resistor a voltage proportional thereto. This voltage is integrated by the integrator 28. In the integrator 28, the average value of the high-frequency components of the voltage at the resistor 16 produced by the switching operations of the transistor 11 is formed. Thus, the difference between the output signal of the integrator 28 and the signal poportional to the rectified input voltage and determined by the resistors 51 to 54 appears at the output 65 of the super-imposition circuit 29.

In the comparison circuit 27, a pulse is produced by which the trigger element 26 is reset when the voltage at the resistor 16 exceeds the output signal of the superposition circuit 29 passed through the voltage divider composed of the resistors 55 and 56. Diagram D of FIG. 2 s shows the envelopes of the high-frequency voltage U4 at the resistor 16. The comparison signal must be adjusted by the resistors 53 to 56 and 63 and 64 in such a manner that the voltage U5 (shown in the diagram E of FIG. 2), which drops at the capacitor 41, has an approximation a rectified sinusoidal variation.

On the assumption that the VDE standard 0871 should be satisfied, the minimum value is obtained for the inductance of the coil 2 of the filter 1 at an inductance of 5 mH of the coil 10 when the linear variation in time of the frequency of the switching pulses takes place between 30 and 115 kHz. The interference voltages then decrease more particularly in the low frequency range.

Figure 3:
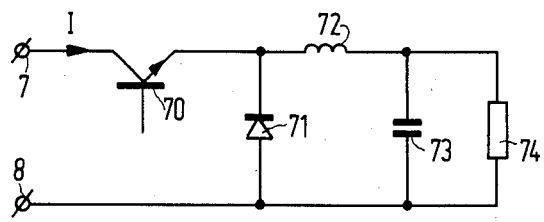
FIGS. 3 and 4 show two further combinatorial circuit parts.
Figure 4:
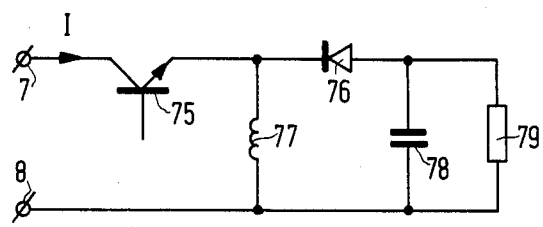

Two further combinatorial circuit parts, which are shown in FIGS. 3 and 4, may also be used in the circuit arrangement shown in FIG. 1. FIG. 3 shows a step-down voltage converter in which the collector of transistor 70, to be controlled by the pulse generator 6, is connected to the output terminal 7 of the rectifier 4 and the emitter is connected to the cathode of a diode 71 and to a coil 72. The coil is connected on the other hand to a parallel arrangement of a capacitor 73 and a load 74 connected to the connection terminal 8. Likewise, the anode of the diode 71 is connected to the connection terminal 8.

FIG. 4 shows a step-up/step-down voltage converter which also comprises a transistor 75, whose collector is connected to the terminal 7 of the rectifier 4, whose base receives the switching pulses of the pulse generator 6 and whose emitter is connected to the cathode of a diode 76 and to a terminal of a coil 77. The anode of the diode 76 is connected to a parallel arrangement of a capacitor 78 and a load 79 connected in turn to the terminal 8. The other terminal of the coil 77 is also connected to the terminal 8 of the rectifier 4.

What is claimed is:

1. A circuit arrangement for forming a direct voltage from an essentially sinusoidal input voltage comprising: a filter for suppressing high-frequency interference signals, a switched mode power supply which includes a diode, a coil, a capacitor and a transistor and is coupled to the filter through a rectifier, the power supply elements being connected so that in the conductive state of the transistor the diode is cut off and coil current flows at least through the transistor and in the cut-off state the current flows through the diode and a parallel arrangement of a load and the capacitor, and a pulse generator responsive to the input voltage to form switching pulses for the transistor whose frequency is varied uniformly in time between a minimum frequency at a maximum value of the rectified input voltage and a maximum frequency at the minimum value, characterized in that the pulse generator comprises, a voltage-to-frequency converter responsive to the input voltage to form starting pulses which determine the beginning of the switching pulses and whose frequency is varied between the minimum and maximum values such that the second derivative of the frequency with respect to time is always zero or negative, a first integrator which produces an integrated output signal proportional to the output current of the rectifier and whose time constant is larger than the reciprocal value of the minimum frequency, a superposition circuit forming an output signal equal to the difference between a signal proportional to the rectified input voltage and the output signal of the first integrator, and a first comparison circuit which produces a signal for terminating a switching pulse when a signal proportional to the output current of the rectifier exceeds the output signal of the superposition circuit.

2. A circuit arrangement as claimed in claim 1, characterized in that the voltage-to-frequency converter comprises a second comparison circuit comparing a reference voltage with a voltage proportional to the rectified input voltage, a monostable trigger element activated by the second comparison circuit when the reference voltage is larger than said voltage proportional to the rectified input voltage, a second integrator which integrates an output signal of the monostable trigger element and whose time constant is larger than the reciprocal value of the frequency of the input voltage, and a voltage-controlled oscillator controlled by the second integrator thereby to produce the starting pulses.

3. A circuit arrangement as claimed in claim 1 wherein the pulse generator comprises a trigger element which produces the switching pulses and to which the starting pulses and the signal of the first comparison circuit are supplied.

4. A circuit arrangement as claimed in claim 1 wherein the superposition circuit comprises an amplifier having a non-inverting input to which is supplied the signal proportional to the rectified input voltage and an inverting input connected via a first resistor to the output of the superposition circuit and to a second resistor connected to the output of the first integrator.

5. A circuit arrangement as claimed in claim 1 characterized in that a voltage divider is coupled between the superposition circuit and the first comparison circuit.

6. A circuit arrangement as claimed in claim 1 characterized in that the coil is connected to the rectifier and to the transistor and through the diode to the parallel arrangement of the load and the capacitor.

7. A circuit arrangement as claimed in claims 1, characterized in that the transistor is connected to the rectifier and to the diode and through the coil to the parallel arrangement of the load and the capacitor.

8. A circuit arrangement as claimed in claim 1, characterized in that the transistor is connected to the rectifier and to the coil and through the diode to the parallel arrangement of the capacitor and the load.

9. A circuit arrangement as claimed in claim 2 wherein the pulse generator comprises a further trigger element which produces the switching pulses and to which the starting pulses and the signal of the first comparison circuit are supplied.

10. A circuit arrangement as claimed in claim 2 wherein the superposition circuit comprises an ampifier having a non-inverting input to which is supplied the signal proportional to the rectified input voltage and an inverting input connected via a first resistor to the output of the superposition circuit and to a second resistor connected to the output of the first integrator.

* * * * *